Patented July 8, 1930

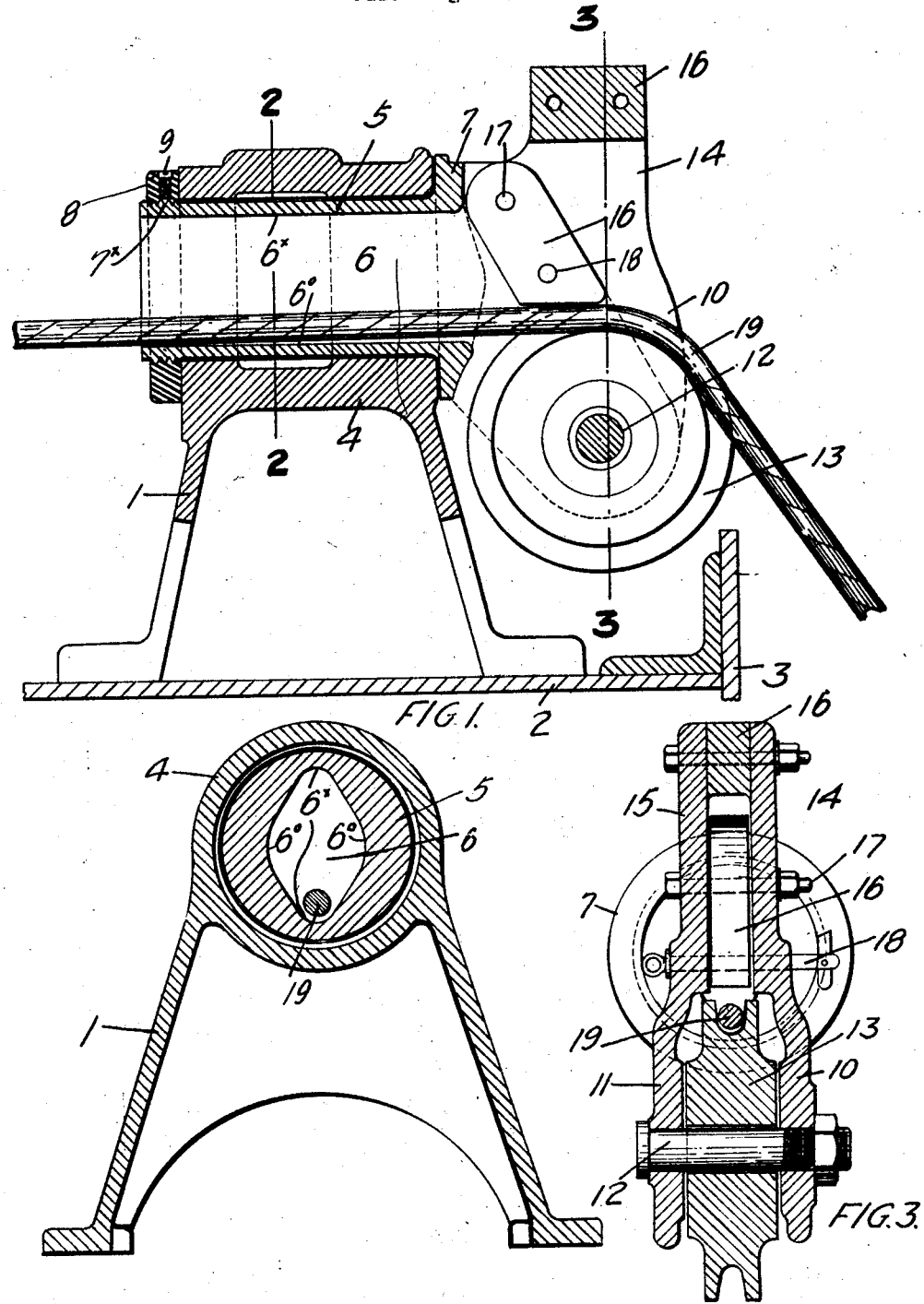

1,769,958

UNITED STATES PATENT OFFICE

LEVY McMILLAN, OF TORONTO, ONTARIO, AND DOWSLEY KENNEDY, OF OWEN SOUND, ONTARIO, CANADA, ASSIGNORS OF ONE-HALF TO THE WILLIAM KENNEDY & SONS LTD., OF OWEN SOUND, ONTARIO, CANADA, A CORPORATION OF CANADA

MOORING CHOCK

Application filed August 30, 1929. Serial No. 389,527.

Our invention relates to improvements in mooring chocks, and the object of the invention is to devise a chock of this type which will lead the cable from any desired direction and automatically adjust itself to any desired change of lead, which will prevent the cable slipping out of engagement and thus eliminate liability to accident during replacement, which is so constructed that it may be secured in place without liability to produce leakage to the supporting structure, and it consists essentially of the arrangement and construction of parts as hereinafter more particularly explained.

Fig. 1 is a sectional view through our chock showing it placed in position upon the supporting structure such as a ship's deck.

Fig. 2 is a sectional view through Fig. 1 on line 2—2.

Fig. 3 is a sectional view through Fig. 1 on line 3—3.

In the drawings like characters of reference indicate corresponding parts in each figure.

1 indicates the main supporting standard of the chock which is secured to a deck 2 in proximity to the gunwale 3. 4 is a cylindrical body formed integral with the upper end of the standard 1 such standard tapering upwardly from its base as clearly indicated in the drawing. 5 is a cylindrical member which is turnably held in the cylindrical body 4 which forms a journal bearing therefor.

The exterior of the member 5 is cylindrical to fit the internal cylindrical orifice of the body 4, its interior being substantially diamond-shaped as indicated at 6 in Fig. 2, the corners of the diamond being rounded off as indicated at 6$^x$ and 6°. The outer end of the cylindrical member 5 is flanged annularly as indicated at 7, the inner face of the flange bearing against the outer end of the body 4. The inner end of the member 5 protrudes from the orifice of the body 4, such protruding portion being provided with an external thread 7.

8 is a securing nut which is screwed on to the threaded portion 7$^x$ and is permanently secured in place by means of a grub screw 9.

10 and 11 are lugs extending from the outer face of the flange portion 7 depending downwardly and outwardly in inclined direction. 12 is a shaft secured in the lugs 10 and 11 upon which is mounted a flanged pulley 13. 14 and 15 are upward extensions of the lugs 10 and 11 between which is secured a counterweight 16, such counterweight serving to counter-balance the weight of the pulley 13 so that it will be held in any place to which it is swung around its centre of motion between the lugs 10 and 11. Above the pulley 13 is secured a block 16 by means of a bolt 17 and a cotter pin or similar withdrawable device 18. 19 is a cable passing through the cylindrical member 5 beneath the lower end of a block 16 and over the pulley 13 outwardly over the ship's side.

In order to enable the cable 19 and any securing device such as a snap hook secured to the end of the cable, being passed over the pulley 13, we withdraw the cotter pin 18 so that the block 16 may be swung up to permit the passage of the hook, the block 16 may be then replaced its lower edge serving to guide the cable and prevent it slipping out from between the flanges of the pulley. Very often a cable slips from its place on the pulley and the replacing of such pulley is very dangerous, accidents often occurring by this operation. By our device this danger is absolutely eliminated. When the line of draw of the cable is altered from one position to another the pulley will swing around its centre of motion formed by the axis of the cylindrical member 5 to any corresponding position, so that there will always be a direct draw from the cable on to the pulley, the counterweight 15 serving to hold the pulley definitely into any place to which it is adjusted.

From this description it will be seen that we have devised a very simple construction of mooring chock, which will automatically adjust itself to any desired position during operation and from which there will be no danger of the cable being displaced and thus producing liability to accident during replacement.

What we claim as our invention is:—

1. A mooring chock comprising a main standard member adapted to be secured to a ship's deck in proximity to the gunwale and having a hollow cylindrical orifice at its upper end, a hollow cylindrical member turnably fitting the orifice and secured from longitudinal movement, lugs extending from the cylindrical member in an outwardly inclined direction, a shaft journalled between the members of the lug, a grooved pulley mounted upon the shaft, and means for maintaining the cable passing through the cylindrical member and over the pulley in engagement with the pulley groove.

2. A mooring chock comprising a main standard member adapted to be secured to a deck in proximity to a ship's gunwale and having a cylindrical orifice at its upper end, a cylindrical member turnably fitting the orifice of the standard and having an orifice extending therethrough the sides of which converge toward the lower portion of the member and between which a cable is adapted to pass, lugs extending from the outer end of the cylindrical member in an outwardly inclined depending direction, a shaft carried by the lugs, a pulley mounted upon the shaft, and means secured between the lugs for holding the cable in contact with the pulley.

3. A mooring chock comprising a main standard member adapted to be secured to a ship's deck in proximity to the gunwale and having a hollow cylindrical orifice at its upper end, a hollow cylindrical member turnably fitting the orifice and secured from longitudinal movement, lugs extending from the cylindrical member in an outwardly inclined direction, a shaft journalled between the members of the lug, a grooved pulley mounted upon the shaft, a block pivotally secured adjacent its upper end between the lugs and the cylindrical member, and having a transverse orifice in proximity to its lower end, and a withdrawable pin extending through the lugs and through the transverse orifice.

4. A mooring chock comprising a main standard member adapted to be secured to a ship's deck in proximity to the gunwale and having a hollow cylindrical orifice at its upper end, a hollow cylindrical member turnably fitting the orifice and secured from longitudinal movement, lugs extending from the cylindrical member in an outwardly inclined direction, a shaft journalled between the members of the lug, a grooved pulley mounted upon the shaft, means for maintaining the cable passing through the cylindrical member over the pulley in engagement with the pulley groove, and means for counterweighting the pulley to hold it in any position to which it is swung.

5. A mooring chock comprising a main standard member adapted to be secured to a ship's deck in proximity to the gunwale and having a hollow cylindrical orifice at its upper end, a hollow cylindrical member turnably fitting the orifice and secured from longitudinal movement, lugs extending from the cylindrical member in an outwardly inclined direction, a shaft journalled between the members of the lug, a grooved pulley mounted upon the shaft, means for maintaining the cable passing through the cylindrical member over the pulley in engagement with the pulley groove, extensions extending upwardly from the lugs, and a counterweight secured between such extensions.

LEVY McMILLAN.
DOWSLEY KENNEDY.